United States Patent
Cohen et al.

(10) Patent No.: US 10,715,418 B1
(45) Date of Patent: Jul. 14, 2020

(54) OPTIMIZED SERVERLESS CLOUD PROCESSING BASED ON PROCESSING JOB REQUIREMENTS

(71) Applicant: NICE LTD., Ra'anana (IL)

(72) Inventors: Yaron Cohen, Modi'in (IL); Peri Fishgold, Tel-Aviv (IL); Alexander Malev, Givat Koach (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 16/551,020

(22) Filed: Aug. 26, 2019

(51) Int. Cl.
  *H04L 29/08* (2006.01)
  *H04L 12/755* (2013.01)
  *H04L 12/26* (2006.01)
  *H04L 12/741* (2013.01)

(52) U.S. Cl.
  CPC ............ *H04L 45/021* (2013.01); *H04L 43/50* (2013.01); *H04L 45/54* (2013.01); *H04L 67/1004* (2013.01)

(58) Field of Classification Search
  CPC ... H04L 45/021; H04L 45/54; H04L 67/1004; H04L 43/50
  See application file for complete search history.

(56) References Cited

U.S. PATENT DOCUMENTS

| | | | | |
|---|---|---|---|---|
| 2014/0173117 A1* | 6/2014 | Takatsu | ............... | H04L 67/1002 709/226 |
| 2019/0026150 A1* | 1/2019 | Shimamura | ........... | G06F 9/5066 |
| 2019/0317808 A1* | 10/2019 | Srinivasan | ............ | G06F 9/5038 |

* cited by examiner

*Primary Examiner* — Kim T Nguyen
(74) *Attorney, Agent, or Firm* — Haynes and Boone, LLP

(57) ABSTRACT

A system is provided for optimized selection of serverless cloud processing units for resource intensive processing operations. The system includes a processor and a computer readable medium operably coupled thereto, to perform the scheduling operations which include receiving a processing operation for a data input that requires processing in a serverless computing environment, determining at least one constraint requirement imposed on performing the processing operation that are all required to be fulfilled for successful completion of the processing operation, accessing a routing table associated with the serverless computing environment, determining one of the plurality of serverless processing units from the routing table based on fulfilling all of the at least one constraint requirement, and assigning the processing operation to the one of the plurality of serverless processing units on the least costly basis or other optimization consideration.

20 Claims, 6 Drawing Sheets

Routing Table 124

| Recording Duration | Compression Type | Bit Rate | Stereo/Mono | Processing Unit |
|---|---|---|---|---|
| < 20 min | G711 | 64 kbit/s | S | 512 MB |
| < 60 min | G711 | 64 kbit/s | S | 1024 MB |
| < 300 min | G711 | 64 kbit/s | S | 3072 MB |
| < 20 min | G711 | 64 kbit/s | M | 512 MB |
| < 60 min | G711 | 64 kbit/s | M | 704 MB |
| < 300 min | G711 | 64 kbit/s | M | 2048 MB |

OPTIMIZED SERVERLESS CLOUD PROCESSING BASED ON PROCESSING JOB REQUIREMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to performing data processing operations in cloud computing environments, and more specifically to a system and method for an optimization process that selects serverless cloud processing units to perform processing of computing operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

When a heavy processing job needs to be performed, service providers commonly provide processing through a server computing machine specified for performance of the job. For example, data processing jobs by workforce management services and providers may request audio data transcoding, big data analytics, screen recordings of workforce agent's operations and input during work (or other types of video compression, rendering, and/or processing), and the like to be performed by a server computing architecture. Server computing machines can process tasks for an arbitrary amount of time, which provides offline data processing that does not require high scalability (e.g., many operations) or a fast response time. However, fast response times require highly specialized and specification machines, each data processing instance can only handle a small amount of data during to heavy process (i.e., the instance has low scalability and is difficult to scale out), and strong machines that are highly specialized result in very high cost and overhead.

In contract, serverless cloud computing allows a cloud provider to allocate resources dynamically for data processing jobs. These resources are specified by the customer and therefore the customer is charged only for allocated resources and the run time for the data processing. This allows for high scalability and a fast response time. Conversely though, serverless computing architectures and technology are designed to handle light processing jobs. Each serverless cloud platform provides a range of processing units and their pricing model depends on the required disk space, execution time, central processing unit (CPU), and/or memory requested or delegated to the processing job. Thus, with a cheap serverless processing unit, the processing job may encounter high processing time or time out before the end of processing (as serverless processing units are limited in execution time). With a stronger or strongest processing unit, the processing job will be provided in a good response time but the cost will be high as serverless processing units are far more expensive than their equivalent server computing machines.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

FIG. 3 is a simplified diagram of an exemplary processing unit routing table for a data file type according to some embodiments.

DETAILED DESCRIPTION

Figure 1:
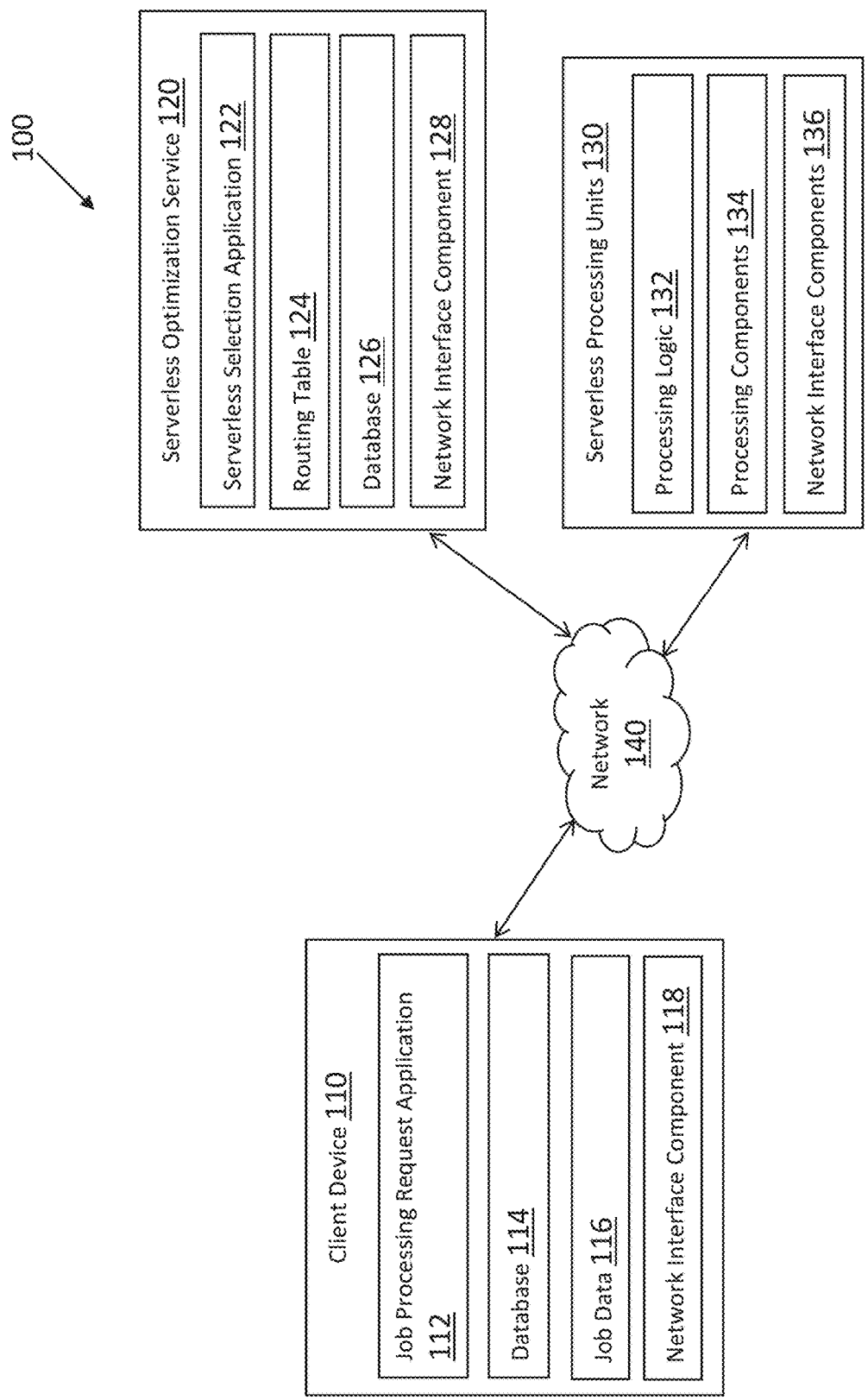
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a serverless cloud computing system, methods, data structures, and systems are provided for optimized serverless processing unit selection based on parameters associated with data processing of a job, operation, or other data task for data input. The parameters associated with processing a job may include particular data specifications and types, such as file size, file duration or length, and other specifications on the data input and/or output files. The parameter may also include particular constraints required to be fulfilled for processing the job, including a processing time or duration to completion, a required restriction on a platform (e.g., CPU type or specifications, disk space size, and the like), a restriction enforced due to a business requirement (e.g., cost based restrictions, maximum file size, length, or duration, and the like), or other restriction as required by an entity requesting the processing job. These restrictions may be enforced and required to be completed without any exceptions such that success of the processing job is dependent of fulfillment of all of the restrictions (or a subset of the restrictions if so designated by the processing requestor). Optimization of a serverless processing unit may be based on overall cost, thereby providing a lowest cost processing unit for a particular processing job. However, in other embodiments, optimization may be based on additional or other factors that are requested to be optimized.

In order to first generate a routing table that may be used to map processing jobs to serverless processing units in an optimized manner, a service provider system associated with or provided by a serverless cloud computing architecture may execute tests of various serverless cloud computing platforms and processing units to determine completion successes by the processing units of the job. For a particular heavy processing job, there may be a number of serverless processing units supported by the service provider system that are available from different cloud platforms to host the process. There may also be a number of processing constraint requirements imposed on the processing job by different platform restrictions and/or business requirements, which may have different values particular to certain processing jobs. Each processing job may include a number of data specifications of the particular file type and/or processing job requirements, which similarly may have different values for different data types, structures, or files for the processing job.

When generating the table, the service provider system may execute tests of each of the number of serverless processing units by requiring all of the processing constraint requirements to be fulfilled or successful for the data specifications. This may be done starting at the least costly of the serverless processing unit so that a least costly or cheapest processing unit can be designated for a particular combination of the constraint requirements and the data specifications. If unsuccessful, a next higher cost processing unit may be tested for success of the processing job within the constraint requirements. However, when successful with a cheapest processing unit, then the routing table is generated and/or updated to designate that cheapest processing unit as successful for a particular processing task.

The service provider system may then receive processing jobs for processing on a serverless processing unit, which includes particular data files or structures for processing having values for the data specifications. These specifications may be used to perform a lookup of the particular processing unit that is successful for hosting the job in a least costly manner. The processing job may be mapped to the cheapest processing unit and then assigned to this processing unit for completion. Additionally, after generation of the routing table, the service provider system may provide a periodic update process of the routing table using the algorithmic approach to table generation by retesting each of the processing units to detect any changes in processing unit specifications and processing successes.

The embodiments described herein provide methods, computer program products, and computer database systems for algorithmic routing table generation used for serverless processing unit selection. The service provider system associated with or provided by the serverless cloud computing architecture and system may therefore provide optimized selection of processing units to users, customers, and other entities when receiving a processing job. For example, the online system may provide a portal that is accessible to provide a particular processing job, including files and/or tasks for processing. Additionally, the online system may allow for designation of particular processing constraint requirements for fulfillment and/or success of completion of the processing job. Once the routing table is established, the online system may then utilize the previously determined routing table to assign the processing job to an optimized (e.g., cheapest) processing unit.

According to some embodiments, in a serverless cloud computing system accessible by a plurality of separate and distinct organizations, a processing unit selection model, algorithm, and routing table is provided for identifying, predicting, and designating particular serverless processing units for completion of processing jobs, thereby optimizing processing unit selection, reducing user cost and input for processing unit selection, and providing faster processing times for high scale processing jobs.

Example Environment

The system and methods of the present disclosure can include, incorporate, or operate in conjunction with or in the environment of a processing job engine, database, and portal, which may include cloud-based computing architecture. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include client device 110, serverless optimization service 120, and serverless processing units 130 that interact to provide automated recommendation, selection, and/or assignment of processing jobs, operations, or tasks to serverless processing units 130. In other embodiments, environment 100 may not have all of the components listed and/or may have other elements instead of, or in addition to, those listed above. In some embodiments, the environment 100 is an environment in which selection of an optimized serverless processing unit is performed. A client device 110 may be any machine or system that is used by a user to provide a processing job, which has data specifications and is required to be completed by satisfying or fulfilling processing constraint requirements imposed on performing the processing job using one of serverless processing units 130. In some embodiments, client device 110 may also be used to designate the constraint requirements, for example, when input from client device 110 is used to establish a routing table 124 used for assignment of processing jobs to one of serverless processing units 130. Client device 110 can be a handheld computing device, a mobile phone, a laptop computer, a notepad computer, a work station, and/or a network of computing devices. As illustrated in FIG. 1, client device 110 might interact via a network 140 with serverless optimization service 120, which generates, provides, and updates routing table 124 used for assignment of processing jobs to one of serverless processing units 130.

Client device 110 may be utilized in order to provide the initial rules, requirements, or other constraints on processing data as a job or operation using one of serverless processing units 130. For example, business and/or serverless platform constraints, restrictions, or requirements may be imposed on processing of the job. A business constraint requirement may be any constraint imposed on processing of the job based on business concerns of a business or entity associated with the processing job (e.g., an entity utilizing client device 110 to provide the processing job). Thus, a business constraint requirement may include a maximum allowable processing time or other execution time requirement, a platform cost, a platform designation (e.g., partner service), a maximum file size or length, or other business consideration to processing of the job. A platform constraint requirement may be restrictions or parameters of the serverless platform or specific unit that processes the job, including a memory size, a predefined CPU, a disk size or space, a processing duration limitation, an input and/or output size, an input/output type, or other platform specification and/or restriction. Each of the imposed constraint requirements may include one or more values such that the constraint requirements define successful processing of the job by being completed within or satisfying all of the imposed constraint requirements. Client device 110 and/or serverless optimization service 120 may provide the constraint requirements when generating a routing table 124 for serverless unit selection when processing a job. Additionally, when a processing job is provided for processing using serverless processing units 130, the constraint requirements may also be designated for lookup using routing table 124.

The processing job may also include data variables, characteristics, and other specifications for an input group of jobs (e.g., data input, files, or other data structures). The data specification may be designated by the input group of files or other data for processing jobs. In this regard, the data specification may be one or a plurality of different parameters, definitions, and other information or metadata that describes a data input. For example, data specifications may correspond to variables for a size, data length, compression type, video compression or parameter, image compression or parameter, or other specification of input data. When generating a routing table, different files having data specifications may be tested for processing jobs. Additionally, when a processing job is received for processing using one of serverless processing units 130, the files or other data for the input processing job may be determined and used for lookup of a corresponding one of serverless processing units 130 in the routing table (e.g., to perform job processing).

In order to generate a routing table according to the disclosure, client device 110 and/or serverless optimization service 120 may first designate the variables and/or values for the constraint requirements and data specifications. An algorithmic approach may then be implemented by serverless optimization service 120 to generate the table. The algorithm defines the minimal processing unit of serverless processing units 130 that can successful complete processing of the job in the least costly manner (or another minimized factor). For example, the algorithm may be defined for a P heavy processing job, with $U_1$-$U_n$ serverless processing units available within the different cloud platforms that can host and process P. Each Ui has a pricing model of the unit. P may also include $S_1$-$S_n$ system constraint requirements imposed on processing P based on platform and/or business requirements or restrictions. An input group $I_1$-$I_n$ may be designated for usage and testing to generate the routing table. Thus, $I_i$ input may be a function of the variables to the input group, such as the variable data characteristics. $P(I_1, \ldots, I_n)=R$, which is the result of a successful process within $S_1$-$S_n$ constraint requirements (e.g., satisfying all requirements). The algorithm A therefore provides $A(U1, \ldots, Un, S1, \ldots, Sn, P, I1, \ldots, In)=T$, where T is the routing table function such that $T(I_i)$=minimum cost processing unit $U_j$. The algorithm is further discussed in reference to FIG. 4.

Thus, serverless optimization service 120 executes tests of each of serverless processing units $U_1$-$U_n$ using test data files having different variables to data specifications based on constraint requirements that are used to define a successful performance and processing of a job. These output routing tables map each of the (relatively) least costly serverless processing units to a processing job having certain data specifications when that processing unit is capable of processing the job while satisfying all constraint requirements. The algorithm may start by testing each processing unit starting from the cheapest, and selecting the first processing unit that successfully completes processing the job within (or by completing) all constraint requirements. If successful with a processing unit, the routing table is generated or updated (e.g., during future periodic tests to update a routing table based on changes to processing units), and the algorithm may proceed to the next input file having different values or variables for data characteristics or specifications. However, if unsuccessful, a more expensive processing unit (e.g., based on processing units disk space, CPU type, memory, etc.) may be tested to see if the more expensive processing unit can successfully complete processing of the job as defined by the constraint requirements. After defining routing table 124 using the algorithm, serverless optimization service 120 stores routing table 124 for use with serverless processing units 130 when receiving a job for processing. Serverless optimization service 120 may also provide routing table 124 to client device 110 for use with processing jobs.

Thus, when a processing job is received (e.g., when client device 110 submits a processing job for hosting on one of serverless processing units 130), the data characteristics or specifications may be determined having particular values for the variables (e.g., file size(s), lengths, etc.). Further, the constraint requirements may be either designated for the processing job or inherently associated with the particular processing job type, file type, and/or data specifications. Using these values, the least costly processing unit of serverless processing units 130 may be determined and looked up routing table 124. The processing job may then be assigned to this processing unit. In some embodiments, the users of client device 110 may differ in their respective capacities, and the capacity of a particular client device 110 might be entirely determined by applications, permissions, and profiles for the current user. Thus, different users will have different capabilities and perform different desktop events with regard to processing jobs with serverless processing units 130 using routing table 124, for example, routing table generation processes and/or assignment processes for processing operations. However, this is not mandatory and it is understood that client device 110 may generally have certain capacities that are universal to users, entities, or other clients (thereby not specific to a operations submitted for processing by serverless optimization service 120).

Client device 110 may execute a web-based client that accesses a web-based application for serverless optimization service 120, or may utilize a rich client, such as a dedicated resident application, to access serverless optimization service 120. Client device 110 may utilize one or more application programming interfaces (APIs) to access and interface with serverless optimization service 120 in order to generate routing tables and/or utilize a routing table for assignment of a processing job or operation, for example, for a data input. Thus, job processing request application 112 can be used to access data and applications hosted by serverless optimization service 120 and to perform searches on stored data, for example, through providing a user interface to a user (e.g., a GUI output) or via an API of job processing request application 112.

Interfacing with serverless optimization service 120 may be provided through job processing request application 112 and may be based on data stored to database 114, such as job data 116. Job data 116 may therefore correspond to test jobs executed to generate routing table 124. In further embodiments, job data 116 may correspond to a processing job to be hosted and processed by one of serverless processing units 130 based on routing table 124. Serverless optimization service 120 may process and provide data through serverless selection application 122 based on routing table 124. Database 126 of serverless optimization service 120 may store data associated with routing table 124. Additionally, database 126 may store additional data associated with routing table 124, such as test data, periodic update intervals, identifiers associated with serverless processing units 130, and the like.

Client device 110 might communicate with serverless optimization service 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and serverless optimization service 120 may occur over network 140 using a network interface component 118 of client device 110 and a network interface component 128 of serverless optimization service 120. In an example where HTTP/HTTPS is used, client device 110 might include an HTTP/HTTPS client commonly referred to as a "browser" for sending and receiving HTTP//HTTPS messages to and from an HTTP//HTTPS server, such as serverless optimization service 120 via network interface component 118. Similarly, serverless optimization service 120 may host an online platform accessible over network 140 that communicates information to and receives information from client device 110 via network interface component 128. Such an HTTP/HTTPS server might be implemented as the sole network interface between client device 110 and serverless optimization service 120, but other techniques might be used as well or instead. In some implementations, the interface between client device 110 and serverless optimization service 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Client device 110 may utilize network 140 to communicate with serverless optimization service 120 and/or serverless processing units 130, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, serverless optimization service 120 is configured to provide webpages, forms, applications, data, and media content to client device 110 and/or to receive data from client device 110, including routing table 124 and/or selection of one of serverless processing units 130 for processing a job. In some embodiments, serverless optimization service 120 may be provided or implemented in a cloud environment, which may be accessible through one or more APIs with or without a correspond graphical user interface (GUI) output. Serverless optimization service 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, serverless processing units 130, shown in FIG. 1, executes processing logic 132 with processing components 134 to provide serverless processing units for processing of data operations, jobs, or other tasks (e.g., audio transcoding, video compression/encoding, big data analytics and processing, and the like). For example, in one embodiment, serverless processing units 130 includes application servers configured to implement and execute software applications as well as provide related data, code, forms, webpages, platform components or restrictions, and other information associated with serverless processing of jobs, and to store to, and retrieve from, a database system related data, objects, and web page content associated with serverless processing. For example, serverless optimization service 120 may implement various functions of processing logic 132 and processing components 134, and the processing space for executing system processes, such as running applications for job processing. Serverless processing units 130 may be accessible over network 140 for processing of a job or operation via network interface components 136. Thus, client device 110 and/or serverless optimization service 120 may send and receive data to one or more of serverless processing units 130 via network interface components, such as test data or processing jobs associated with routing table 124 generation or processing of a job in a serverless environment, respectively. Serverless processing units 130 may be provided by one or more serverless processing platforms, such as Amazon Web Services® (AWS) Cloud Computing Services, Google Cloud Platform®, Microsoft Azure® Cloud Platform, and the like.

Several elements in the system shown in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients.

Client device 110 may run an HTTP/HTTPS client, e.g., a browsing program, such as Microsoft's Internet Explorer browser, Netscape's Navigator browser, Opera's browser, or a WAP-enabled browser in the case of a cell phone, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to serverless optimization service 120 that provides one or more APIs for interaction with client device 110 in order to submit test data inputs, generate a routing table, and/or assign a data processing unit to one of serverless processing units 130 for processing using the routing table.

Thus, client device 110, serverless optimization service 120, and/or serverless processing units 130 and all of their components might be operator configurable using application(s) including computer code to run using a central processing unit, which may include an Intel Pentium® processor or the like, and/or multiple processor units. A server for client device 110, serverless optimization service 120, and/or serverless processing units 130 may correspond to Window®, Linux®, and the like operating system server that provides resources accessible from the server and may communicate with one or more separate user or client devices over a network. Exemplary types of servers may provide resources and handling for business applications and the like, which may be utilized to generate routing tables and assign business data inputs and processing operations or requests to serverless processing units based on routing tables. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring serverless optimization service 120 and/or serverless processing units 130 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Scheduling Assistance Model

Figure 2:
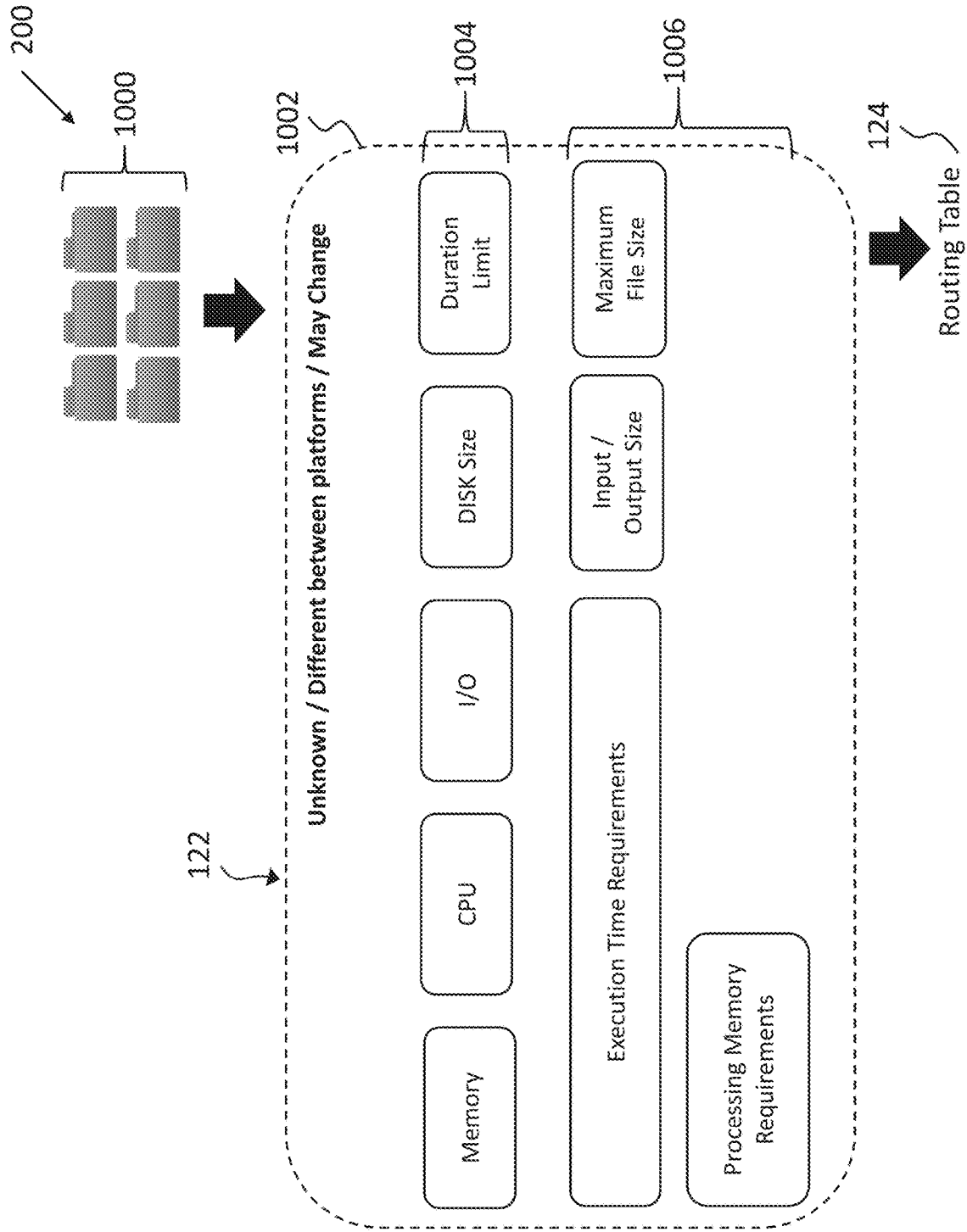
FIG. 2 is a simplified diagram of test data input used to generate a processing unit routing table based on data specifications and processing constraint requirements according to some embodiments.

FIG. 2 is a simplified diagram of test data input used to generate a processing unit routing table based on data specifications and processing constraint requirements according to some embodiments. Environment 200 of FIG. 2 includes serverless selection application 122 and routing table 124 discussed in reference to environment 100 of FIG. 1. In this regard, environment 200 displays a generation of routing table 124 by serverless selection application 122 using input parameters for test data files or content with designated constraint requirements required to be fulfilled by a serverless processing unit in order to have successful processing of each test data file.

In environment 200, data input 1000 is entered to serverless selection application 122 as test data utilized to generate routing table 124 when other constraint requirements are designated for satisfaction, completion, and/or fulfillment to successfully process each file or data structure for data input 1000. In this regard, data input 1000 requests a processing job or operation associated with data input 1000. This processing operation has one or more constraint requirements imposed by either an administrator, a business requirement, a platform restriction, or other rule provider, which are required to be fulfilled in order for processing of each of data input 1000 to be successful. This may include successful processing to finish (e.g., no time out), a time limitation on processing, a processing unit disk space, a pre-defined CPU, a maximum file size or duration, or other requirement imposed by the processing unit platform and/or a business decision or requirement.

For example, constraint requirements shown in environment 200 may include platform requirements 1004 and business requirements 1006. Platform requirements 1004 are shown as a processing unit memory, a CPU, an input/output (I/O), a disk size, and a duration limit (e.g., a maximum processing time). Business requirements 1006 are shown as an execution time requirement, an input/output (I/O) size, a maximum file size (or other length or size of data input 1000, such as a recording duration), processing memory requirements, and/or other parameter or specification designated for the input and/or output data file or structure. Each of platform requirements 1004 and business requirements 1006 may include a value for the particular constraint requirement variable, such as 1-minute processing length, a maximum file size, and the like. Platform requirements 1004 and business requirements 1006 may change depending on the serverless processing platform providing the serverless processing units. For example, other cost concerns, processing job limitations, and/or cloud platform restrictions may change the values of the constraint requirements and/or impose different constraint requirements.

Moreover, data input 1000 may also include data specifications of the input group, which is variables for data characteristics or other specifications that have different values. Exemplary types of data specifications may correspond to the characteristics of the data input files or structures. In this regard, with an audio transcoding processing job having a batch of test audio files, the variables for the data specifications may include a compression type, a bit rate, a stereo/mono selection, a file size, or an audio duration. In other processing job types and/or input data, the variables for the data specification may include audio/video characteristics of the input/output file, file size, text characteristics, image characteristics, or other specifications of the data.

Figure 4:
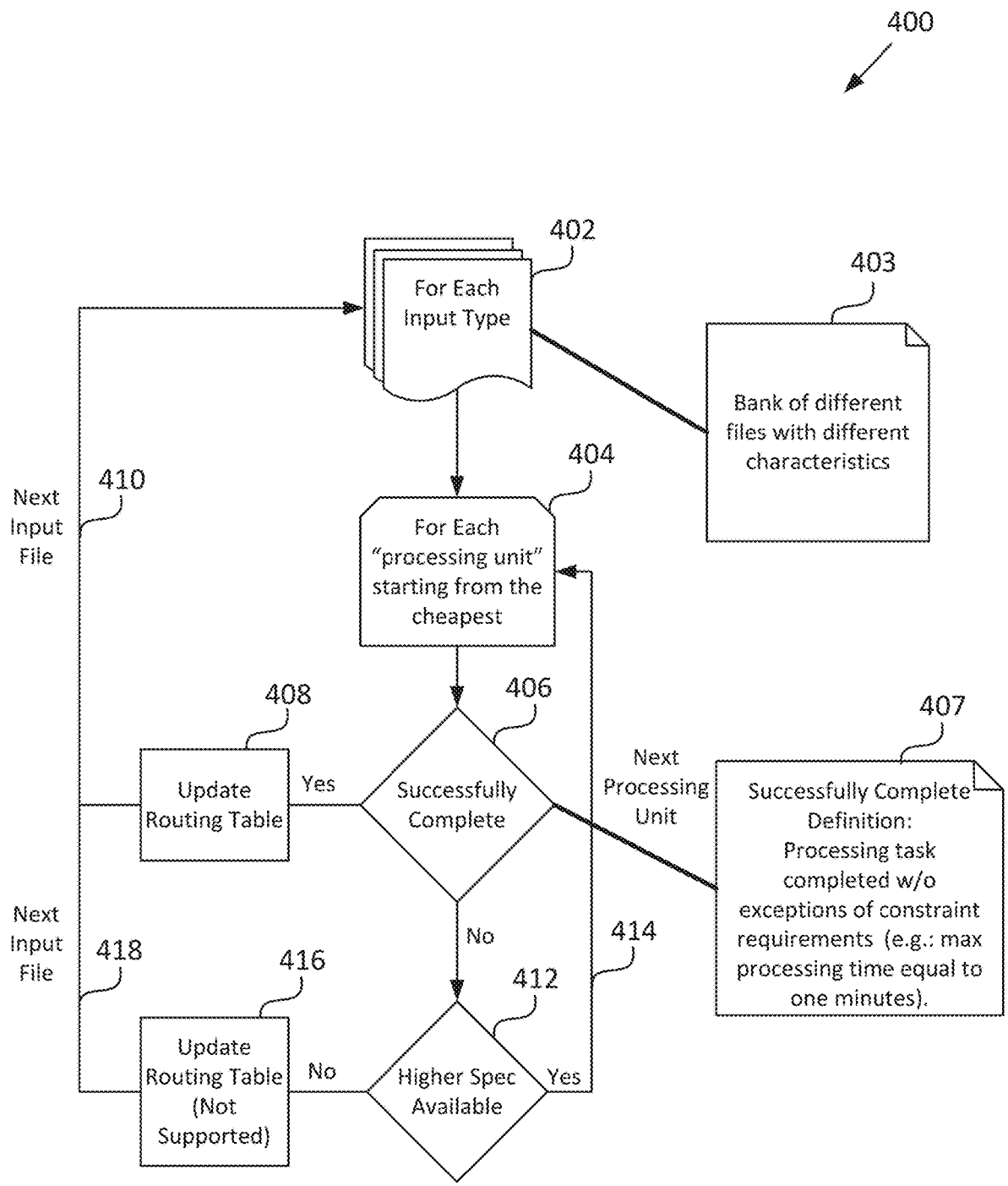
FIG. 4 is a simplified diagram of a process to establish a routing table for optimized selection of a serverless cloud processing unit according to some embodiments.

Based on the constraint requirements, data input 1000 having the data specifications may be test run through different serverless processing units and/or platforms to determine which processing units are capable of successfully fulfilling each of the constraint requirements for data input 1000, as discussed in further detail with respect to FIG. 4. Serverless selection application 122 may proceed with each of the processing units (and/or platforms) from least costly to determine which processing unit can successfully handle one of data input 1000 having certain values for the input's data specifications, where successful handling is defined by successfully fulfilling or completing each of the constraint requirements imposed on the processing job. If successful, the processing unit is entered to routing table 124 as the least costly processing unit that can host the processing job, which is the resulting output from serverless selection application 122, as shown in FIG. 3.

FIG. 3 is a simplified diagram of an exemplary processing unit routing table for a data file type according to some embodiments. Environment 300 of FIG. 3 includes routing table 124 discussed in reference to environment 100 of FIG. 1. In this regard, environment 300 displays routing table 124 generated using the input, parameters, constraints, and specifications described in environment 200 of FIG. 2. For example, different data specifications for input file types are shown so that, based on the established constraint requirements all required to be fulfilled for the processing job, routing table 124 will designate a particular serverless processing unit to complete the job (e.g., by successfully fulfilling all those constraint requirements). This processing unit is designated as the most "optimized," such as a cheapest processing unit. However, optimization may also be performed based on processing speed, resulting file type or specifications, and the like. Environment 300 includes a sample routing table for a transcoding processing job of audio files. However, it is understood that other types of processing jobs may require routing tables having different data specifications, constraint requirements, and routing to selection of serverless processing units. As such, FIG. 3 is exemplary and does not restrict the routing table generation and use described herein to transcoding processing jobs.

The data specifications of an input data type, file, or structure of a processing job may include a recording duration 1010, a compression type 1012, a bit rate 1014, and a stereo/mono specification 1016. However, these exemplary data specifications and merely used as a specific example and are not limiting of the types of data specifications. As such, the discussion of the data specifications used for generation of a routing table in environment 300 is one embodiment of an exemplary routing table and data specifications and it is understood other, more, or less data specifications may also be utilized in generation of a routing table.

As demonstrated in environment 300, each of recording duration 1010, compression type 1012, bit rate 1014, and/or stereo/mono specification 1016 may have the same or different values for the particular input data specifications. Thus, when an input file type is received, and a processing job is requested to be hosted and processed on a serverless cloud computing processing unit, routing table 124 may be utilized to lookup a processing unit 1018. The data input's values for recording duration 1010, compression type 1012, bit rate 1014, and/or stereo/mono specification 1016 are matched or otherwise used to lookup one of processing unit 1018. For example, a data input having a recording duration of less than 20 minutes, with G711 compression, 64 kbit/s bit rate, and a stereo file requires a 512 MB processing unit. This processing unit results in proper processing of the data input for the processing job by satisfying all of the constraint requirements in the least costly or otherwise most efficient manner. By selecting a higher or more costly processing unit, resources and costs would be wasted even if the constraint requirements are fulfilled. Other values for the data characteristics may therefore require a different one of processing unit 1018 to successfully fulfill all the constraint requirements in a least costly manner, such as a higher specification serverless processing unit. In order to generate routing table 124 shown in environment 300, a breakdown of the algorithmic flowchart used to generate routing table 124 is shown in more detail in FIG. 4.

FIG. 4 is a simplified diagram of a process to establish a routing table for optimized selection of a serverless cloud processing unit according to some embodiments. Note that one or more steps, processes, and methods described herein of flowchart 400 may be omitted, performed in a different sequence, or combined as desired or appropriate. Flowchart 400 of FIG. 4 includes algorithmic processes to generate a routing table based on data input for a processing job and constraint requirements on the processing job discussed in reference to environments 100, 200, and 300 of FIG. 1, FIG. 2, and FIG. 3, respectively.

At block 402 of flowchart 400, the algorithm begins by, for each input type, performing test executions of test files or inputs for a processing job. Block 403 describes that each input type, there may be a bank of input files or other data structures that include different characteristics. These may include the specific parameters or specifications for the data structures, such as file size and the like. After designating an input type for a processing job, the bank of different input files may be designated so as to test a variety of different exemplary input files that may be requested for a processing job performed by a serverless processing unit. For example, common or likely test data files may be selected, generated, or accessed and used to test serverless processing units to identify a least costly unit that can successfully process the data input within or by fulfilling the constraint requirements on the processing job. Moreover, with each input type, the processing constraint requirements for the processing job may further be established based on business and/or platform requirements or restrictions.

Once the input type for a processing job is designated, at block 404, the algorithm may proceed testing for each serverless processing unit starting from the cheapest. The algorithm may determine, at block 406, whether successful completion of the processing job is performing by the processing unit (starting from the cheapest processing unit). Block 407 defines successful completion as a processing task completed by a processing unit for an input data file or structure without exceptions to the processing constraint requirement (e.g., maximum processing time of 1 minute). If, at block 406, successful completion of the processing job for the data input is confirmed, the algorithm proceeds to block 408 where a routing table is updated to reflect that the least costly/cheapest processing unit is able to successfully complete the processing job. Thereafter, the algorithm proceeds to step 410, where a next input file is selected, and the algorithm returns to block 402 to designate the particular data characteristics and again determine whether the cheapest processing unit is capable of successfully fulfilling all of the constraint requirements on the next input file.

However, if instead at block 406 the processing unit was not capable of successfully fulfilling all the constraint requirements on the processing job for the particular data input, the algorithm proceeds to block 412 where a high specification processing unit is identified and determined to be available. This may be the next least expensive processing unit that provides higher end specifications for data processing. If yes, the algorithm proceeds to step 414, where the algorithm proceeds back to testing the "cheapest" processing unit, now designated to be the high specification processing unit, which may be more expensive. However, since the cheaper processing unit fails to successfully complete the processing job within the constraint requirements, the new cheapest processing unit is the higher specification processing unit. The algorithm then continues to test the higher specification unit to determine whether there is successful completion at block 406. If so, then the routing table is updated to reflect the higher specification processing unit is capable of processing the job at block 408, and the algorithm returns to step 410 and then block 402.

However, if at block 412, a higher specification processing unit is not available, the algorithm proceeds to block 416 where the routing table is updated to reflect that job processing of the particular data input having certain data characteristics is not supported (e.g., cannot be completed with the constraint requirement on the job processing. The algorithm may then continue to step 418, where a next input file or data structure is selected, where the algorithm returns to block 402 to determine if there can be successful processing of that input file.

Figure 5:
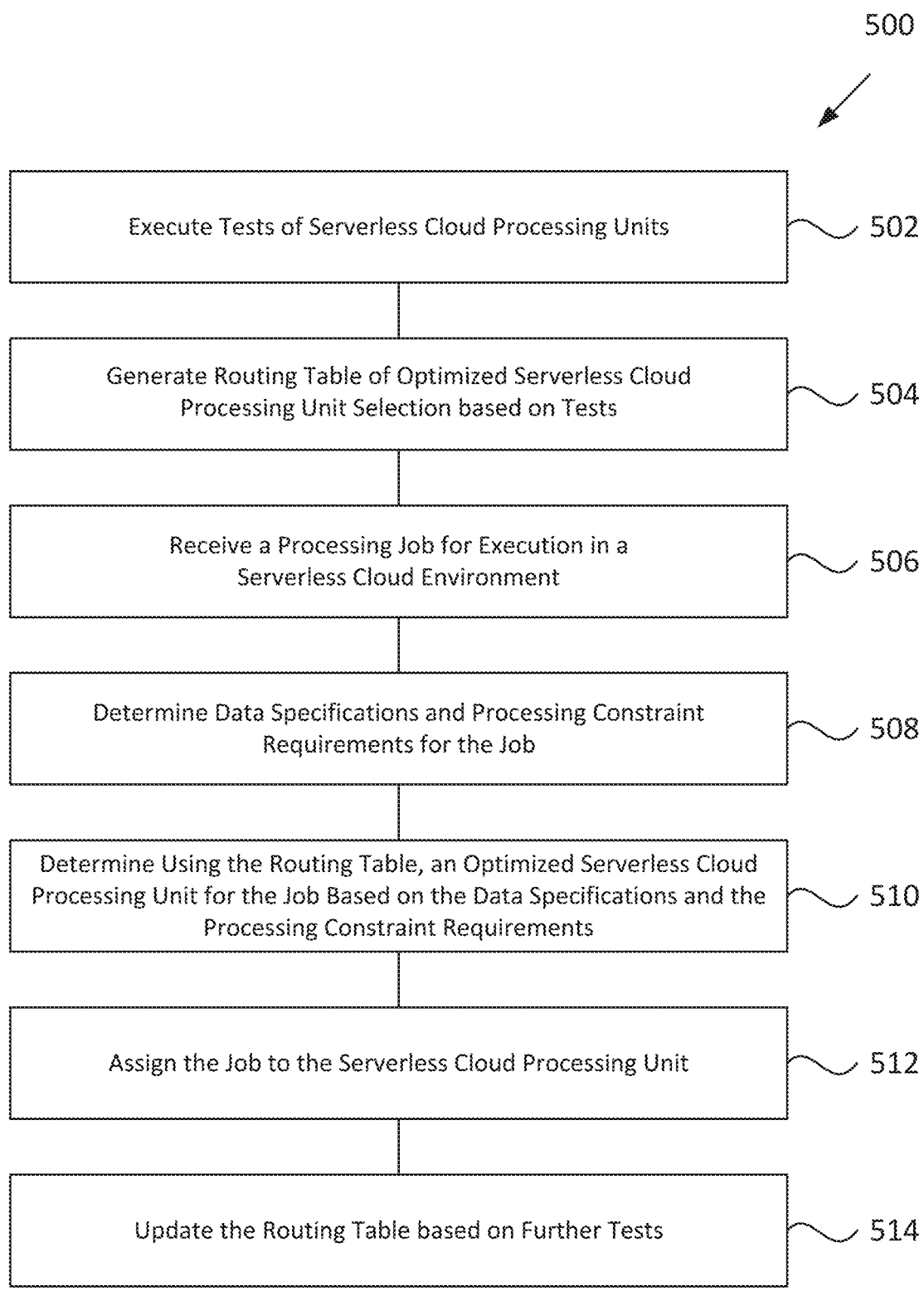
FIG. 5 is a simplified diagram of an exemplary flowchart for optimized selection of a serverless cloud processing unit for a processing job according to some embodiments.

FIG. 5 is a simplified diagram of an exemplary flowchart for optimized selection of a serverless cloud processing unit for a processing job according to some embodiments. In some embodiments, generation of a routing table for serverless processing unit selection described in method 500 of FIG. 5 can be implemented and performed using an online serverless selection system, such as serverless optimization service 120. One or more of the processes 502-514 of method 500 may be implemented, at least in part, in the form of executable code stored on non-transitory, tangible, machine-readable media that when run by one or more processors may cause the one or more processors to perform one or more of the processes 502-514. In some embodiments, method 500 can be performed by one or more computing devices in environment 100 of FIG. 1.

At step 502, tests of serverless cloud processing units are executed, for example, based on test data files or structures that include different data specifications or characteristics. These tests are executed having different constraint requirements imposed on the processing job such that all those constraint requirements are required to be satisfied in order to have a successful processing of the job for a particular data input. For example, FIG. 4 describes an algorithm used to generate a routing table, at step 504, which is a routing table of optimized serverless cloud processing unit selection based on the tests. This routing table therefore designates a least costly processing unit of a serverless cloud processing platform that can perform data processing of data input having certain data specifications. This routing table may therefore be used to assign a processing job for a data input to a particular serverless processing unit in a least costly manner.

At step 506, a processing job is received for execution in a serverless cloud environment. The processing job includes data input that has particular data characteristics or specifications. Moreover, the particular processing job has processing constraint requirements established for the job based on the business concerns or requirements and the platform restrictions for the processing job. These constraint requirements may be imposed by the system when the routing table is established and may include particular values for the processing job to be processed within to have successful completion of the processing job. Thus, at step 508, the data specifications and processing constraint requirements for the job are determined. These may be determined by analyzing the inputted data for the processing job, as well as determining those constraint requirements set on the processing job (e.g., designated for the operation to be hosted and conducted in the serverless cloud computing environment).

Once those limitations, requirements, and specifications are determined, at step 510, it is determined, using the routing table, an optimized serverless cloud processing unit for the job based on the data specifications and the processing constraint requirements. The optimized unit may correspond to a cheapest or least costly unit to perform the job of the data input while satisfying all of the processing constraint requirements. However, other optimizations may also be designated, such as fastest, highest output data specification, or the like. Once the processing unit is determined, at step 512, the job is assigned to the serverless cloud processing unit. Thereafter the job is processed by that unit. Additionally, the routing table may be updated based on further tests, which may be performed in a manner similar to generating the routing table through the algorithm, at step 514. For example, a periodic function or process may, at certain time intervals, perform additional tests of the serverless processing units using test data inputs and the constraint requirements to determine if changes or updates to processing units may cause the routing table to change (e.g., if a cheaper processing unit is available for a mapping of data characteristics to the processing units based on the constraint requirements).

As discussed above and further emphasized here, FIGS. 1, 2, 3, 4, and 5 are merely examples of serverless optimization service 120 and corresponding methods for optimized serverless processing unit selection, which examples should not be used to unduly limit the scope of the claims. One of ordinary skill in the art would recognize many variations, alternatives, and modifications.

Figure 6:
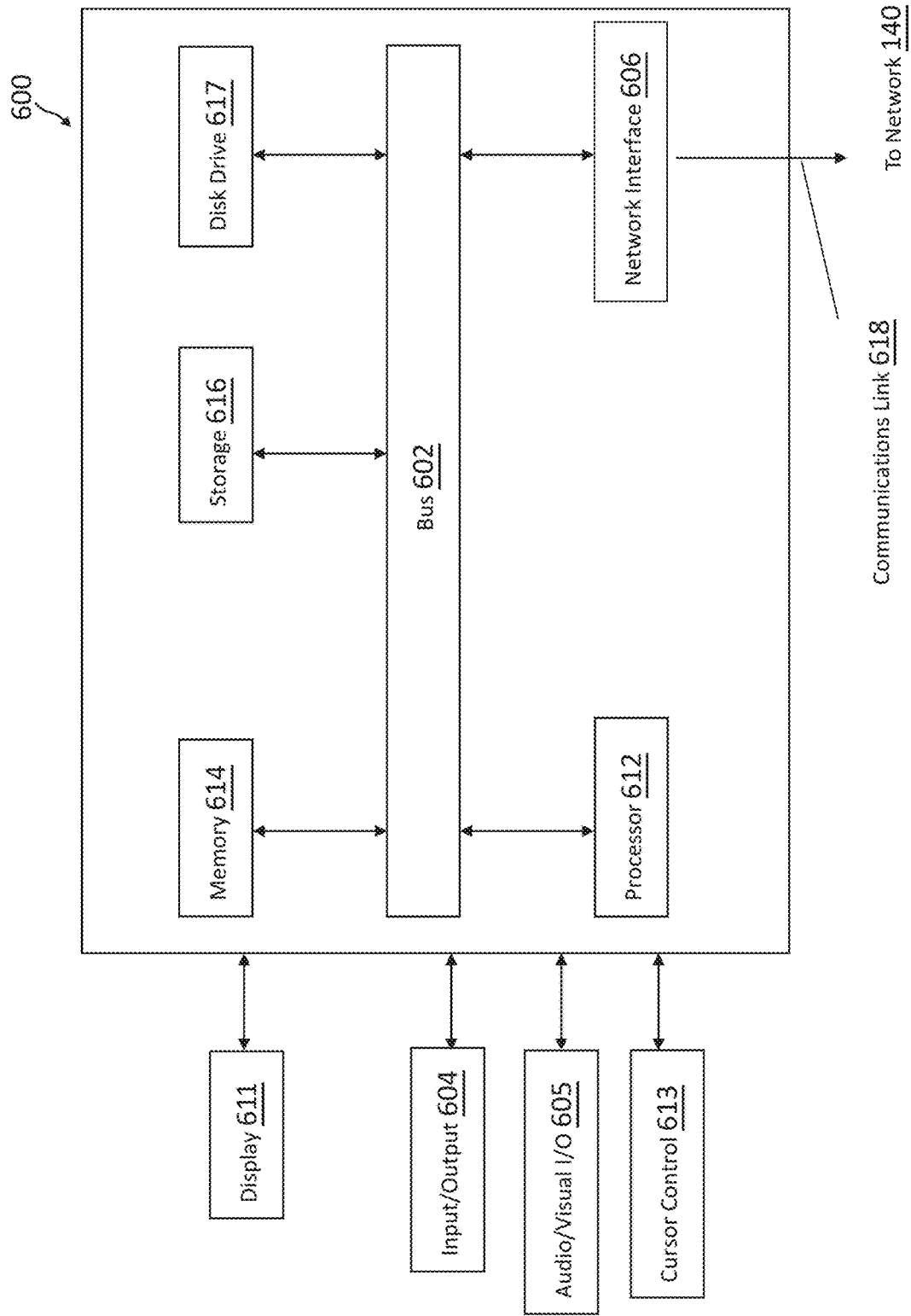
FIG. 6 is a simplified diagram of a computing device according to some embodiments.

FIG. 6 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A system for optimized selection of serverless cloud processing units for resource intensive processing operations, the system comprising:
   a processor and a computer readable medium operably coupled thereto, the computer readable medium comprising a plurality of instructions stored in association therewith that are accessible to, and executable by, the processor, to perform optimized selection operations which comprise:
   receiving a processing operation for a data input that requires processing in a serverless computing environment, wherein the processing operation comprises at least one data specification associated with the data input;
   determining at least one constraint requirement imposed on performing the processing operation for the data input in the serverless computing environment, wherein all of the at least one constraint requirement are required to be fulfilled for successful completion of the processing operation for the data input;

accessing a routing table associated with the serverless computing environment, wherein the routing table comprises a mapping of a plurality of serverless processing units to first values for the at least one data specification with successful fulfillment of second values for the at least one constraint requirement;

determining one of the plurality of serverless processing units from the routing table based on fulfilling all of the at least one constraint requirement for the at least one data specification; and assigning the processing operation to the one of the plurality of serverless processing units.

2. The system of claim 1, wherein the determining the one of the plurality of serverless processing units comprises selecting the one of the plurality of serverless processing units based on a least costly processing unit of the plurality of serverless processing units that can successfully fulfill all of the at least one constraint requirement for the at least one data specification of the data input.

3. The system of claim 1, wherein the routing table maps the first values for the at least one data specification with the successful fulfillment of the second values for the at least one constraint requirement to the plurality of serverless processing units based on a least costly one of the plurality of serverless processing units that performs the resource intensive processing operations for the first values and the second values.

4. The system of claim 3, wherein prior to the receiving the processing operation, the optimized selection operations further comprise:

generating the routing table, wherein the generating comprises:

for an input data type, determining the first values for the at least one data specification;

receiving the second values for the at least one constraint requirement;

for each of the plurality of serverless processing units, executing a first test of each of the plurality of serverless processing units using sample data inputs having the first values associated with the input data type;

determining that the first test was successful for the sample data inputs based on the first test meeting all of the second values for the at least one constraint requirement;

assigning the least costly one of the plurality of serverless processing units, which have been determined to be successful based on meeting all of the at least one constraint requirement, to each of the first values; and generating the routing table based on the assigning.

5. The system of claim 4, wherein the optimized selection operations further comprise:

performing an update periodically of the routing table for the plurality of serverless processing units, wherein the performing the update comprises:

executing, based on the update periodically performed of the routing table, at least one second test of the plurality of serverless processing units using the sample data inputs having the first values associated with the input data type, wherein the at least one second test represents the update periodically performed of the routing table;

determining whether the at least one second test was successful for the sample data inputs based on the second values for the at least one constraint requirement; and periodically updating the routing table based on the determining whether the at least one second test was successful.

6. The system of claim 5, wherein the update is periodically performed at a time interval designated for the update, and wherein the update changes the least costly one of the plurality of serverless processing units assigned to each of the first values and the second values.

7. The system of claim 4, wherein each of the plurality of serverless processing units are associated with a processing specification comprising at least one of required disk space, execution time, a central processing unit (CPU), a memory specification, or another processing unit specification.

8. The system of claim 1, wherein the at least one data specification for the data input comprises a plurality of data specifications associated with input parameters of the data input, and wherein the first values are associated with each of the input parameters for the plurality of data specifications.

9. The system of claim 1, wherein the at least one constraint requirement comprises at least one of a platform disk space size, a selection of a CPU type, a length of serverless processing unit use for the processing operation, or a maximum data input size.

10. A method for optimized selection of serverless cloud processing units for resource intensive processing operations, which method comprises:

receiving a processing operation for a data input that requires processing in a serverless computing environment, wherein the processing operation comprises at least one data specification associated with the data input;

determining at least one constraint requirement imposed on performing the processing operation for the data input in the serverless computing environment, wherein all of the at least one constraint requirement are required to be fulfilled for successful completion of the processing operation for the data input;

accessing a routing table associated with the serverless computing environment, wherein the routing table comprises a mapping of a plurality of serverless processing units to first values for the at least one data specification with successful fulfillment of second values for the at least one constraint requirement;

determining one of the plurality of serverless processing units from the routing table based on fulfilling all of the at least one constraint requirement for the at least one data specification; and assigning the processing operation to the one of the plurality of serverless processing units.

11. The method of claim 10, wherein the determining the one of the plurality of serverless processing units comprises selecting the one of the plurality of serverless processing units based on a least costly processing unit of the plurality of serverless processing units that can successfully fulfill all of the at least one constraint requirement for the at least one data specification of the data input.

12. The method of claim 10, wherein the routing table maps the first values for the at least one data specification with the successful fulfillment of the second values for the at least one constraint requirement to the plurality of serverless processing units based on a least costly one of the plurality of serverless processing units that performs the resource intensive processing operations for the first values and the second values.

13. The method of claim 12, wherein prior to the receiving the processing operation, the method further comprises:
generating the routing table, wherein the generating comprises:
for an input data type, determining the first values for the at least one data specification;
receiving the second values for the at least one constraint requirement;
for each of the plurality of serverless processing units, executing a first test of each of the plurality of serverless processing units using sample data inputs having the first values associated with the input data type;
determining that the first test was successful for the sample data inputs based on the first test meeting all of the second values for the at least one constraint requirement;
assigning the least costly one of the plurality of serverless processing units, which have been determined to be successful based on meeting all of the at least one constraint requirement, to each of the first values; and
generating the routing table based on the assigning.

14. The method of claim 13, further comprising:
performing an update periodically of the routing table for the plurality of serverless processing units, wherein the performing the update comprises:
executing, based on the update periodically performed of the routing table, at least one second test of the plurality of serverless processing units using the sample data inputs having the first values associated with the input data type, wherein the at least one second test represents the update periodically performed of the routing table;
determining whether the at least one second test was successful for the sample data inputs based on the second values for the at least one constraint requirement; and
periodically updating the routing table based on the determining whether the at least one second test was successful.

15. The method of claim 14, wherein the update is periodically performed at a time interval designated for the update, and wherein the update changes the least costly one of the plurality of serverless processing units assigned to each of the first values and the second values.

16. A non-transitory computer-readable medium having stored thereon computer-readable instructions executable to cause optimized selection of serverless cloud processing units for resource intensive processing operations, which optimized selection operations comprise:
receiving a processing operation for a data input that requires processing in a serverless computing environment, wherein the processing operation comprises at least one data specification associated with the data input;
determining at least one constraint requirement imposed on performing the processing operation for the data input in the serverless computing environment, wherein all of the at least one constraint requirement are required to be fulfilled for successful completion of the processing operation for the data input;
accessing a routing table associated with the serverless computing environment, wherein the routing table comprises a mapping of a plurality of serverless processing units to first values for the at least one data specification with successful fulfillment of second values for the at least one constraint requirement;
determining one of the plurality of serverless processing units from the routing table based on fulfilling all of the at least one constraint requirement for the at least one data specification; and
assigning the processing operation to the one of the plurality of serverless processing units.

17. The non-transitory computer-readable medium of claim 16, wherein the determining the one of the plurality of serverless processing units comprises selecting the one of the plurality of serverless processing units based on a least costly processing unit of the plurality of serverless processing units that can successfully fulfill all of the at least one constraint requirement for the at least one data specification of the data input.

18. The non-transitory computer-readable medium of claim 16, wherein the routing table maps the first values for the at least one data specification with the successful fulfillment of the second values for the at least one constraint requirement to the plurality of serverless processing units based on a least costly one of the plurality of serverless processing units that performs the resource intensive processing operations for the first values and the second values.

19. The non-transitory computer-readable medium of claim 18, wherein the optimized selection operations further comprise:
generating the routing table, wherein the generating comprises:
for an input data type, determining the first values for the at least one data specification;
receiving the second values for the at least one constraint requirement;
for each of the plurality of serverless processing units, executing a first test of each of the plurality of serverless processing units using sample data inputs having the first values associated with the input data type;
determining that the first test was successful for the sample data inputs based on the first test meeting all of the second values for the at least one constraint requirement;
assigning the least costly one of the plurality of serverless processing units, which have been determined to be successful based on meeting all of the at least one constraint requirement, to each of the first values; and
generating the routing table based on the assigning.

20. The non-transitory computer-readable medium of claim 19, wherein the optimized selection operations further comprise:
performing an update periodically of the routing table for the plurality of serverless processing units, wherein the performing the update comprises:
executing, based on the update periodically performed of the routing table, at least one second test of the plurality of serverless processing units using the sample data inputs having the first values associated with the input data type, wherein the at least one second test represents the update periodically performed of the routing table;
determining whether the at least one second test was successful for the sample data inputs based on the second values for the at least one constraint requirement; and periodically updating the routing table based on the determining whether the at least one second test was successful.

\* \* \* \* \*